(12) United States Patent
Nagata et al.

(10) Patent No.: US 10,313,911 B2
(45) Date of Patent: Jun. 4, 2019

(54) MOBILE STATION, BASE STATION AND RADIO COMMUNICATION METHOD

(71) Applicant: NTT DOCOMO, INC., Tokyo (JP)

(72) Inventors: Satoshi Nagata, Tokyo (JP); Yuichi Kakishima, Palo Alto, CA (US); Chongning Na, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/572,833

(22) PCT Filed: May 13, 2016

(86) PCT No.: PCT/JP2016/064347
§ 371 (c)(1),
(2) Date: Nov. 9, 2017

(87) PCT Pub. No.: WO2016/182072
PCT Pub. Date: Nov. 17, 2016

(65) Prior Publication Data
US 2018/0146389 A1  May 24, 2018

(30) Foreign Application Priority Data
May 14, 2015 (CN) .......................... 2015 1 0246237

(51) Int. Cl.
*H04W 24/10* (2009.01)
*H04W 16/28* (2009.01)
(Continued)

(52) U.S. Cl.
CPC .......... *H04W 24/10* (2013.01); *H04B 7/0626* (2013.01); *H04L 5/0048* (2013.01);
(Continued)

(58) Field of Classification Search
CPC ..... H04W 24/10; H04W 24/08; H04W 16/28; H04W 72/04; H04L 5/0048
See application file for complete search history.

(56) References Cited

U.S. PATENT DOCUMENTS 9,191,957 B2   11/2015  Kim et al.
9,520,973 B2   12/2016  Kim et al.
(Continued)

FOREIGN PATENT DOCUMENTS

JP   2014-527370 A   10/2014
WO  2014/010994 A1   1/2014

OTHER PUBLICATIONS

International Search Report of the International Searching Authority issued in PCT/JP2016/064347 dated Jun. 7, 2016 (2 pages).
(Continued)

*Primary Examiner* — Afshawn M Towfighi
(74) *Attorney, Agent, or Firm* — Osha Liang LLP

(57) ABSTRACT

The present invention provides a mobile station, a base station and a radio communication method. A mobile station pertaining to the present invention is provided, including a receiving section configured to receive information that indicates at least one reference signal resource and measurement window information that indicates an allocation of a measurement window; a measuring section configured to measure a reference signal, to which precoding has been applied, based on the information that indicates the at least one reference signal resource and the measurement window information, and to generate a measurement result; and a transmitting section configured to transmit the measurement result.

13 Claims, 6 Drawing Sheets

(51) Int. Cl.
*H04W 72/04* (2009.01)
*H04L 5/00* (2006.01)
*H04W 24/08* (2009.01)
*H04B 7/06* (2006.01)
*H04B 7/0456* (2017.01)

(52) U.S. Cl.
CPC ........... *H04L 5/0082* (2013.01); *H04W 16/28* (2013.01); *H04W 24/08* (2013.01); *H04W 72/04* (2013.01); *H04B 7/0482* (2013.01)

(56) References Cited

U.S. PATENT DOCUMENTS

| | | |
|---|---|---|
| 2012/0082052 A1 | 4/2012 | Oteri et al. |
| 2014/0079149 A1 | 3/2014 | Lee et al. |
| 2014/0094162 A1* | 4/2014 | Heo ........................ H04W 4/70 455/422.1 |
| 2014/0323144 A1 | 10/2014 | Kim et al. |
| 2015/0195020 A1* | 7/2015 | Zhu ...................... H04B 7/0617 370/329 |

OTHER PUBLICATIONS

Written Opinion of the International Searching Authority issued in PCT/JP2016/064347 dated Jun. 7, 2016 (4 pages).
CATT; "Evaluation of beamformed CSI-RS with 16-64 TXRU"; 3GPP TSG RAN WG1 Meeting #80, R1-150754; Athens, Greece; Feb. 9-13, 2015 (11 pages).
Pantech; "Multiple codebooks for CSI feedback to enhance MIMO"; 3GPP TSG RAN 1 #65, R1-111651; Barcelona, Spain; May 9-13, 2011 (3 pages).
Extended European Search Report issued in the counterpart European Patent Application No. 16792796.1, dated Jan. 21, 2019 (7 pages).

* cited by examiner

MOBILE STATION, BASE STATION AND RADIO COMMUNICATION METHOD

TECHNICAL FIELD

The present invention relates to a mobile station, a base station and a radio communication method. More specifically, the present invention relates to a mobile station, a base station and a radio communication method based on multi-antenna technology.

BACKGROUND ART

In MIMO technology, the capacity of wireless networks can be clearly improved by providing a plurality of antennas in order to carry out data transmission via diversity and multiplexing schemes. In a conventional communication system, normally a plurality of user devices (UEs) are distinguished from each other in a horizontal dimension by providing a plurality of antennas in a base station that are arranged in a one-dimensional array. For example, four emission antennas for simultaneously communicating with a plurality of UEs can be provided in a base station, and these four emission antennas are arranged in a 4×1 one-dimensional array.

However, for example, in a three-dimensional cell environment having a macro cell and a small cell, etc., UEs are positioned at different altitudes. For example, a plurality of UEs can be positioned on different floors of a building. In such a case, with an existing linear array that distinguishes a plurality of UEs only in a horizontal dimension, it is difficult to accurately distinguish a plurality of UEs that are positioned at different altitudes. In view of this, three-dimensional beamforming technology has been proposed in order to increase the throughput of the radio communication system by further improving the signal transmission quality between the base station and the mobile station, whereby it is possible to enhance the spatial diversity in the vertical dimension with such three-dimensional beamforming technology.

In three-dimensional beamforming technology, the base station uses a two-dimensional antenna array to communicate with a mobile station.

Compared to a one-dimensional antenna, in a two-dimensional antenna array, in addition to antennas being arranged in the horizontal dimension and horizontal beam control performed, antennas are also arranged in the vertical dimension (altitude direction) and beam control is performed, thereby achieving three-dimensional beamforming. By using three-dimensional beamforming, a higher beamforming gain can be obtained, and a good signal transmission quality can be obtained with mobile stations in different locations (especially in different high locations).

On the other hand, before the base station transmits downlink data to the mobile station, channel estimation is necessary. Specifically, the mobile station carries out channel estimation in accordance with a channel-state information—reference signal (CSI-RS) that is transmitted from the base station, the channel estimation result is fed back to the base station, and the base station transmits downlink data based on the channel estimation result. In a conventional communication system, the CSI-RS that is transmitted from the base station is not subject to beamforming. In other words, the CSI-RS that is transmitted in each direction is the same.

SUMMARY OF INVENTION

Technical Problem

The CSI-RS that the base station transmits in each direction is the same, and since the CSI-RSs that are transmitted to all the mobile station are same, in a conventional radio communication system, the mobile station cannot obtain an accurate channel estimation for different beams by measuring different beam gains in accordance with the CSI-RS that is transmitted from the base station. Furthermore, in a conventional communication system, the base station transmits the same CSI-RS to all the mobile station to which the base station is connected.

Solution to Problem

According to an aspect of the present invention, a mobile station is provided, including a receiving section configured to receive information that indicates at least one reference signal resource and measurement window information that indicates an allocation of a measurement window; a measuring section configured to measure a reference signal, to which precoding has been applied, based on the information that indicates the at least one reference signal resource and the measurement window information, and to generate a measurement result; and a transmitting section configured to transmit the measurement result.

According to an aspect of the present invention, an information transmission method carried out by a base station is provided, the information transmission method including obtaining a channel direction of a mobile station; generating a beam corresponding to a reference signal by precoding in accordance with an obtained channel direction; selecting at least one reference signal resource for transmitting the generated beam from a plurality of preconfigured reference signal resources; and transmitting information that indicates the selected reference signal resource to the mobile station, and controlling the mobile station to measure the beam, which is transmitted using the at least one reference signal resource, based on said information.

According to an aspect of the present invention, a beam measuring method carried out by a mobile station is provided, the beam measuring method including receiving, from a base station, information that indicates at least one reference signal resource for the mobile station, wherein at least one reference signal resource thereof is selected by the base station from a plurality of preconfigured reference signal resources; measuring the beam that is transmitted using the at least one reference signal resource based on said information, and generating a measurement result; and transmitting the measurement result to the base station.

According to an aspect of the present invention, a base station is provided, the base station including a direction obtaining section configured to obtain a channel direction of a mobile station; a precoding section configured to generate a beam corresponding to a reference signal by precoding, in accordance with the obtained channel direction; a resource selecting section configured to select at least one reference signal resource for transmitting the generated beam from a plurality of preconfigured reference signal resources; and a transmitting section configured to transmit, to the mobile station, information that indicates the selected reference signal resource, and to control the mobile station to measure the beam that is transmitted using the at least one reference signal resource based on said information.

According to an aspect of the present invention, a mobile station is provided, the mobile station including a receiving section configured to receive, from a base station, information that indicates at least one reference signal resource for the mobile station, wherein at least one reference signal resource thereof is selected by the base station from a plurality of preconfigured reference signal resources; a measuring section configured to measure a beam that is transmitted using the at least one reference signal resource based on said information, and to generate a measurement result; and a transmitting section configured to transmit the measurement result to the base station.

Advantageous Effects of Invention

According to the above-described aspects of the present invention, the base station generates a beam corresponding to a reference signal by precoding the reference signal in accordance with the direction of each mobile station, notifies the mobile station of at least one reference signal resource for transmitting the generated beam, so that each mobile station measures the gain of each beam in accordance with the beam, for the mobile station, which the base station transmits using at least one reference signal resource, thereby obtaining a more accurate channel estimation result. Furthermore, due to the base station notifying the mobile station of only the at least one reference signal resource for transmitting the beam for the mobile station, the signaling overhead that is needed for achieving the measurement of the gain of each beam is reduced.

BRIEF DESCRIPTION OF DRAWINGS

Other objectives, features and advantages of the present invention will come apparent in the below-discussed embodiment of the present invention, combined with the drawings.

DESCRIPTION OF EMBODIMENTS

Figure 1:
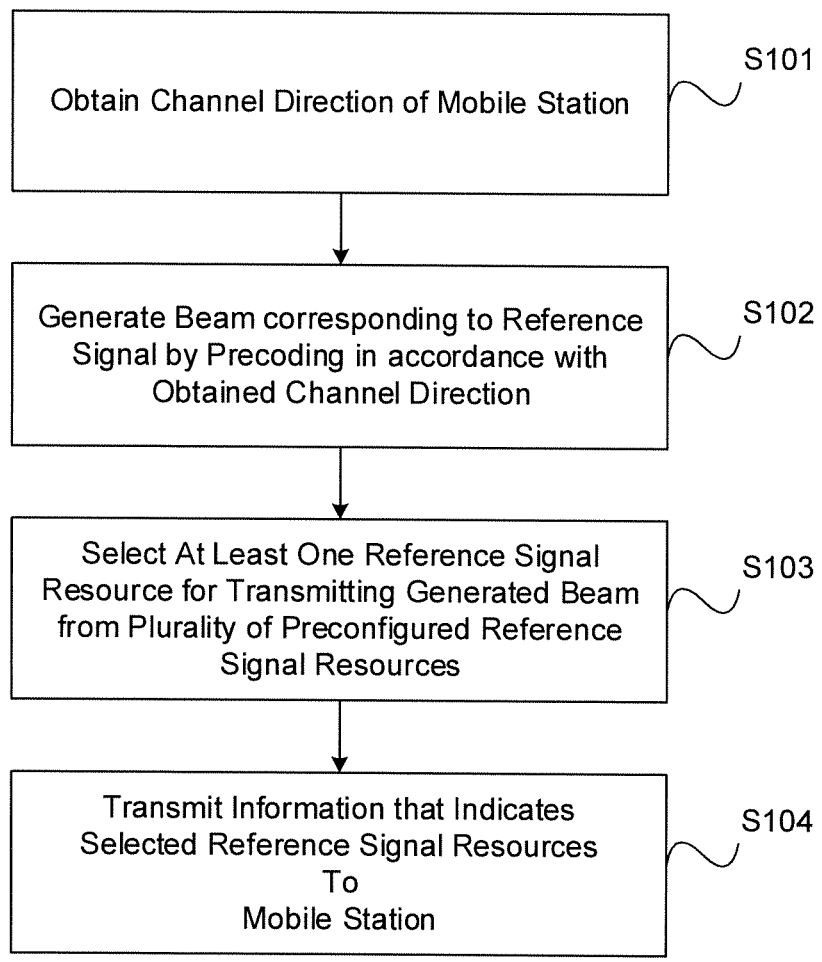
FIG. 1 is a flowchart showing an information transmission method according to an embodiment of the present invention.

The following is a description of an information transmission method, a beam measuring method, a mobile station, and a base station pertaining to an embodiment of the present invention, with reference to the drawings. In the drawings, the same reference designators always designate the same elements. The below-described embodiment is for explanatory purposes only, and clearly should not be interpreted as limiting the scope of the present invention thereto.

FIG. 1 shows a flowchart which describes an information transmission method 100 according to an embodiment of the present invention. The information transmission method 100 may be performed by a base station. According to the illustrated embodiment, diversity is carried out in a base station in the horizontal dimension and/or the vertical dimension, in the spatial domain, by an arrangement of an antenna array. Hereinbelow the information transmission method 100 according to an embodiment of the present invention will be discussed with reference to FIG. 1.

In a communication system, in the case where the number of preconfigured reference signal resources are great, if each mobile station receives beams corresponding to reference signals of all of the CSI-RS resources, respectively, and carries out channel estimation based on each beam, each mobile station would need to carry out a large amount of calculations and would need to report channel state information for a large number of beams; thereby causing a high complexity of calculations and a large work load. Whereas, each beam corresponding to the reference signal of each CSI-RS resource has a different direction, however, a mobile station positioned in some locations do not need to receive beams that have a direction that is far from the location of such a mobile station.

On the basis of the above recognition, in the embodiment of the present invention, the base station selects some of the CSI-RS resources from out of the preconfigured CSI-RS resources and notifies each mobile station. Each mobile station carries out channel estimation only with respect to the beams in the notified CSI-RS resources. Specifically, as shown in FIG. 1, in step S101, a channel direction of the mobile station is obtained. For example, the base station estimates the uplink channel of the mobile station in accordance with a sounding reference signal (SRS), and a downlink channel is derived based on mutuality between the uplink channel and the downlink channel, thereby obtaining the channel direction of the mobile station.

As another example, the base station first transmits an existing CSI-RS, to which beamforming is not applied, to the mobile station, and consequently the mobile station reports the direction indicator (CDI) thereof, so that the channel direction of the mobile station is obtained in accordance with the CDI.

As another example, the base station transmits a discovery reference signal (DRS) that has been subject to beamforming to the mobile station, and consequently controls the mobile station to report the selected reference signal received power (RSRP), and obtains the channel direction of the mobile station in accordance with the RSRP measurement that is reported by the mobile station.

In step S102, the base station generates a beam corresponding to the reference signal (e.g., CSI-RS) by precoding in accordance with the obtained channel direction. For example, when mobile stations are located at different locations within the same cell, since the channel direction of each mobile station at each location is different, the beams corresponding to the reference signals that are generated in accordance with each channel direction of each mobile station are different.

In step S103, at least one reference signal resource for transmitting the generated beam(s) is selected from a plurality of preconfigured reference signal resources. For example, the base station selects, from a plurality of preconfigured CSI-RS resources (herein assumed as N1 (N1 being a natural number greater than 1) CSI-RS resources for convenience), at least one CSI-RS resource (herein assumed as N2 (N2 being a natural number) CSI-RS resources for convenience) as a CSI-RS resource which can be allocated for the mobile station. According to an example of the present invention, N2 may be 1.

For example, when the base station can determine an optimum beam for the mobile station in accordance with the channel direction information of the mobile station, the base station generates a specified beam of one direction with respect to the mobile station via precoding, and selects one reference signal resource, for transmitting such a beam, from the preconfigured N1 reference signal resources.

According to another example of the present invention, N2 may be greater than 1 and less than N1. For example, the base station estimates a plurality of beams that are suitable for the mobile station in accordance with the channel direction information of the mobile station, however, when an optimum beam cannot be determined for the mobile station, the base station generates beams for a plurality of directions for the mobile station via precoding, and selects a plurality of reference signal resources for transmitting the plurality of beams, respectively, from preconfigured N1 reference signal resources. Accordingly, the mobile station selects the optimum direction for the mobile station by measuring the beams transmitted in the plurality of reference signal resources.

Figure 2:
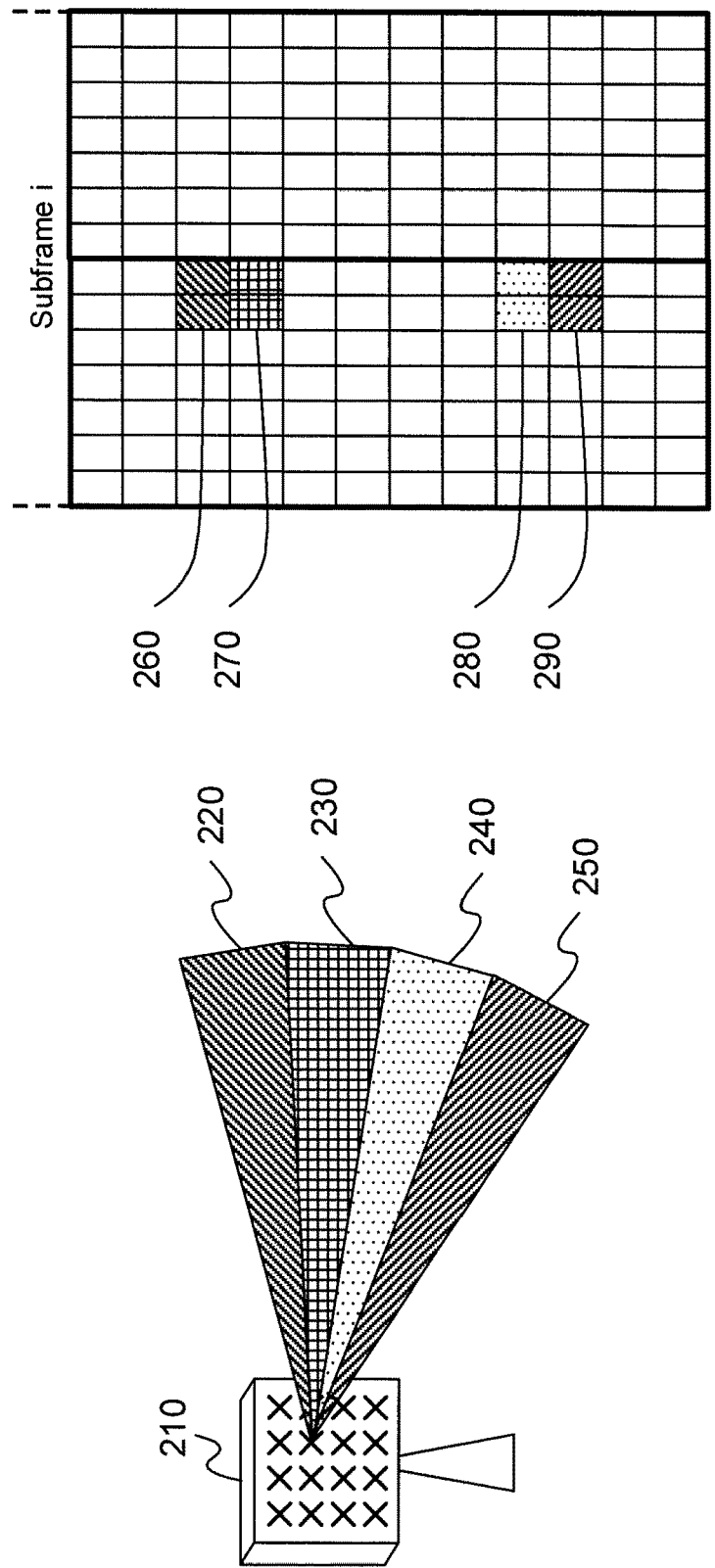
FIG. 2 is an explanatory diagram showing an example of reference signal resources for transmitting a generated beam.

FIG. 2 is an explanatory diagram showing an example of reference signal resources for transmitting a generated beam. As shown in FIG. 2, the beams corresponding to reference signals that are generated by a base station 210 in accordance with specified mobile station channel directions are designated as beams 220, 230, 240 and 250. In accordance with step S103, in subframe i the base station uses reference signal resource block 260 to transmit beam 220, uses reference signal resource block 270 to transmit beam 230, uses reference signal resource block 280 to transmit beam 240, and uses reference signal resource block 290 to transmit beam 250.

Returning to FIG. 1, in step S104, information that indicates the selected reference signal resource(s) is transmitted to the mobile station, and the mobile station measures the beam that is transmitted using at least one reference signal source based on said information. For example, information that indicates the selected reference signal resource may include time resource allocation, frequency resource allocation and/or coding resource allocation, etc., corresponding to the reference signal resource.

The base station periodically or aperiodically transmits a beam corresponding to a reference signal a plurality of times using the reference signal resource. In order to secure accuracy of measurement, the mobile station normally carries out a measurement of a beam that is transmitted by the same reference signal resource a plurality of times, obtains a plurality of measurement values, and carries out a statistical process (e.g., an averaging process on the obtained plurality of measurement values, a joining process, or a synthesizing process, etc.) on the obtained plurality of measurement values, whereby a final measurement result of the beam that is transmitted by the reference signal resource is calculated.

Figure 3:
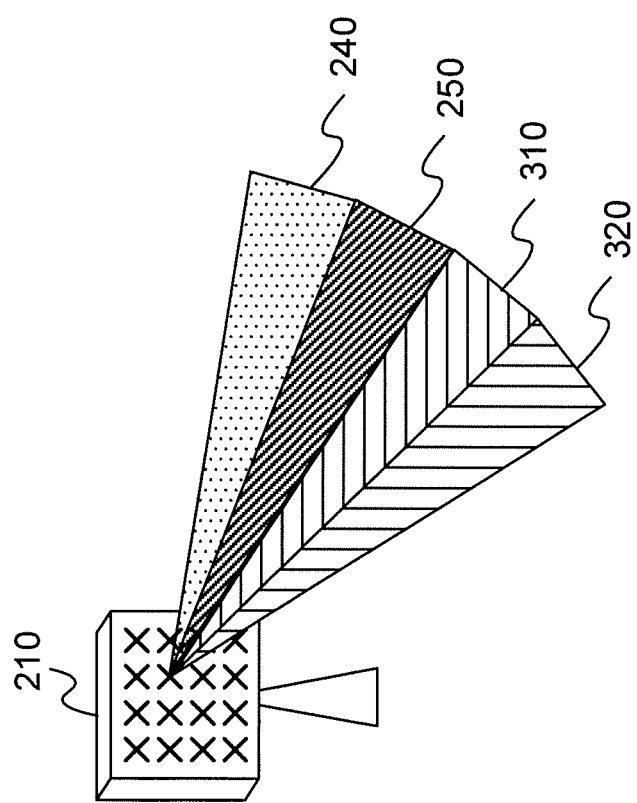
FIG. 3 is an explanatory diagram showing an example in which the base station has changed the precoding scheme that is shown in FIG. 2.

However, the base station can change the precoding scheme for the reference signal, whereby the beam corresponding to the generated reference signal correspondingly changes. In such a case, it is possible for beams transmitted by the same reference signal resource to change. FIG. 3 is an explanatory diagram showing an example in which the base station has changed the precoding scheme that is shown in FIG. 2.

As shown in FIG. 3, after the precoding scheme is changed, the beams corresponding to the reference signals generated by the base station 210 changed from beams 220, 230, 240 and 250 to beams 240, 250, 310 and 320. In the example shown in FIG. 3, the base station 210 uses reference signal resource block 280 that previously transmitted beam 240 to transmit beam 310, and uses reference signal resource block 290 that previously transmitted beam 250 to transmit beam 320. Whereas, if the beams at the measured specified reference signal resources change, the measurement results that the mobile station obtains, by performing a statistical process on the measurement values before and after the beams are changed in the reference signal resources, are inaccurate.

In view of this, according to an example of the present invention, in step S104, the information that is transmitted to the mobile station may include measurement window information that indicates the allocation of a plurality of measurement windows, wherein the base station does not change the precoding scheme in one of the measurement windows, i.e., does not use a specified reference signal resource to change the transmitted beam. Furthermore, a plurality of measurement windows do not overlap each other. The mobile station carries out a statistical process on a plurality of measurement values of beams that are transmitted by specified reference signal resources in the same measurement window in accordance with measurement window information transmitted by the base station, and avoids carrying out a statistical process on a plurality of measurement values of beams that are transmitted by specified reference signal resources in a different measurement window.

For example, the measurement window may be a measurement window in the time domain, or a measurement window in the frequency domain. In another example, the measurement window information may include the starting position of the measurement window and the length of the measurement window. The starting position of the measurement window may be notified in accordance with the starting position of the subframe and a shift amount with respect to the starting position of the subframe. Furthermore, the measurement window information may include the number of resource blocks included in each resource window. For example, measurement window information with respect to a measurement window in a frequency domain may include 'k' frequency blocks that are included in each resource, in which 'k' is a natural number greater than 1. The mobile station can determine that all of the frequency bands used by the base station are evenly divided into a plurality of measurement windows in accordance with the measurement window information, and that each measurement window includes k frequency blocks.

Alternatively, in another example of the present invention, in step S104, the information that is transmitted to the mobile station may include statistical process instruction information; this statistical process instruction information instructs whether or not the mobile station performs a statistical process on the plurality of measurement results of each beam. For example, statistical process instruction information instructs not to perform a statistical process, whereby, in accordance with said information, the mobile station does not carry out any form of statistical process on the plurality of measurement results of each beam.

Furthermore, the base station transmits the beams corresponding to reference signals via at least two antennas. In another example of the present invention, in step S104, the information that is transmitted to the mobile station may include port information, in which the port information indicates the antenna ports for transmitting the beams that are generated in accordance with the channel direction of the mobile station. According to another example of the present invention, each antenna port of the transmission beams indicates one polarized wave. Accordingly, the mobile station determines a codebook to be used when feeding back the measurement results of the beams in accordance with port information.

However, according to some technical specifications of the third generation partnership project (3GPP) (e.g., 3GPP Rel. 8, and 3GPP Rel. 12), the same antenna port size may have different codebooks. In view of this, according to another example of the present invention, in step S104, information that is transmitted to the mobile station may include codebook information that indicates the codebook that the mobile station should use when feeding back the measurement results of the beams.

Furthermore, in order to reduce the signaling overhead and improve flexibility, according to another example of the present invention, in step S104, the information that is transmitted to the mobile station includes at least two parts. Specifically, the information transmitted to the mobile station may include first resource information, wherein the first resource information indicates a resource number list of a selected at least one reference signal resource, and the number of beams of which the measurement results thereof need to be reported by the mobile station. More specifically, each signal of the plurality of preconfigured reference signals has a corresponding resource number. The first resource information includes only a resource number list of the reference signal resources that are selected for a specified mobile station.

Furthermore, the information that is transmitted to the mobile station may include second resource information. The second resource information includes transmission resource information of each reference signal that is indicated by the resource numbers included in the first resource information, in which the transmission resource information may be information on time, frequency or coding resource for transmitting the beams corresponding to the reference signals. The second resource information may include transmission resource information regarding a plurality of preconfigured reference signal resources.

Furthermore, the first resource information may include information for applying all of the reference signal resources, and the second resource information may include information for applying only the reference signal resources that are selected for a specified mobile station via the above-described steps S101 through S103. For example, when a measurement window configured by the base station is applied to all of the reference signal resources, the first resource information may include the measurement window information, and when a measurement window configured by the base station is applied only to the reference signal resources selected for a specified mobile station, the second resource information may include the measurement window information.

Similarly, when antenna ports that transmit beams and codebooks that should be used when the mobile station feeds back the measurement results of the beams are applied to all of the reference signal resources, the first resource information may include the port information and codebook information; and when antenna ports that transmit beams and codebooks that should be used when the mobile station feeds back the measurement results of the beams are applied only to the reference signal resources selected for a specified mobile station, the second resource information may include the antenna port information and codebook information.

Furthermore, alternatively, the information that is transmitted to the mobile station in step S104 may include temporary resource information; the temporary resource information instructs a temporary change in the first resource information and the second resource information. For example, when necessary, the temporary resource information may instruct to reset the measurement window. Temporary resource information in regard to each user may be transmitted. Alternatively, temporary resource information in regard to each cell or a specified user set may be transmitted. Furthermore, according to an example of the present invention, the first resource information and the second resource information may be transmitted by RRC signaling, and the temporary resource information may be transmitted by transmission of DCI signaling, which is transmitted more frequently than RRC signaling.

In the radio communication method of the embodiment of the present invention, the base station generates beams corresponding to reference signals by precoding reference signals in accordance with the directions of each mobile station, and notifies each mobile station of at least one reference signal resource for transmitting the generated beams. Each mobile station can obtain a more accurate channel estimation result by measuring the gain of each beam in accordance with the beams for each mobile station that are transmitted using the notified reference signal resources. Furthermore, since the base station only notifies each mobile station of at least one reference signal resource for transmitting the beams for the mobile station, the signaling overhead necessary for carrying out the measurement of the gain of each beam can be reduced.

Figure 4:
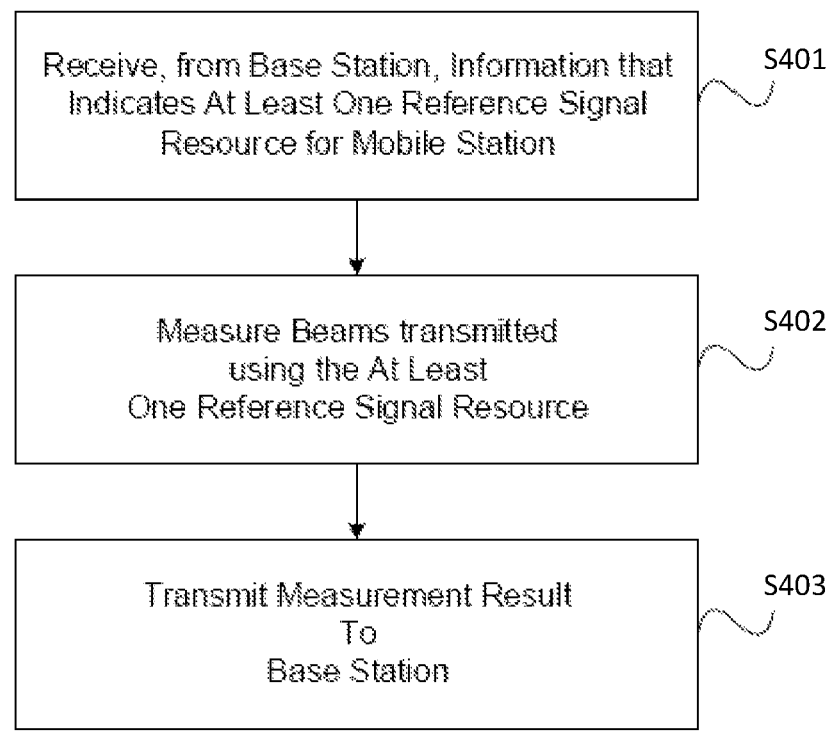
FIG. 4 is a flowchart describing a beam measuring method according to another embodiment of the present invention.

FIG. 4 is a flowchart describing a beam measuring method 400 according to another embodiment of the present invention. The beam measuring method 400 may be carried out by the mobile station. In the beam measuring method 400, the mobile station may carry out a measurement in accordance with information that indicates at least one reference signal resource for the mobile station, in which the information that indicates at least one reference signal resource may be that which is transmitted from the base station by the information transmission method indicated in FIGS. 1 through 3.

Hereinbelow, the beam measuring method 400 according to an embodiment of the present invention will be described with reference to FIG. 4. As shown in FIG. 4, in step S401, the mobile station receives, from the base station, information that indicates at least one reference signal resource for the mobile station. The at least one reference signal resource is selected by the base station from a plurality of preconfigured reference signal resources.

In step S402, the mobile station measures the beams transmitted using the at least one reference signal resource based on the information received at step S401, and generates measurement results. For example, information that indicates the selected reference signal resource(s) may include time resource allocation, frequency resource allocation and/or coding resource allocation, etc., corresponding to the reference signal resource(s). In step S402, the mobile station measures the beams corresponding to the reference signals transmitted by the corresponding resource by the base station in accordance with the time resource allocation, the frequency resource allocation and/or the coding resource allocation indicated by the received information.

As described above, according to an example of the present invention, the information that indicates the at least one reference signal resource for the mobile station may include first resource information and second resource information. In this case, the mobile station first determines the resource number of the reference signal resource that requires measurement in accordance with the first resource information, and obtains specific information on the reference signal resource corresponding to the resource number from out of the second resource information in accordance with the resource number.

Furthermore, according to another example of the present invention, in step S402, the mobile station may obtain one set of measurement values by measuring the reference signal transmitted using a reference signal resource a plurality of times per each reference signal resource. Furthermore, by performing a statistical process on the obtained plurality of measurement values, a final measurement result of the beam that is transmitted by the reference signal resource is calculated. The obtained plurality of measurement values may be averaged to obtain a measurement result. Alternatively, a weight-summing process, etc., may be performed on the plurality of measurement values to obtain a measurement result. Furthermore, the mobile station may measure beams a plurality of times, at a predetermined period, on a specified frequency indicated in the information received in step S401.

In order to ensure that the plurality of measurement results subject to statistical processing in the mobile station are measurement results of the same beam, the information received at step S401 may include measurement window information that indicates the allocation of a plurality of measurement windows. As described above, in one measurement window, a beam that is transmitted using at least one reference signal resource does not change. In step S402, by carrying out a statistical process on the plurality of measurement values obtained in the same measurement window per each reference signal resource, a measurement result of the reference signals in the reference signal resource is generated, and a statistical process is not carried out on the plurality of measurement values obtained in different measurement windows. Furthermore, when the number of measurements of the beams that are transmitted using the reference signal resources reach a measurement-number upper limit that is indicated in the measurement window information, it is desirable to delete the data history of the measurement values to avoid an influence on a measurement result of beams in a new measurement window.

Alternatively, according to another example of the present invention, the information received at step S401 may include statistical process instruction information; this statistical process instruction information instructs whether or not the mobile station performs a statistical process on the plurality of measurement results of each beam. For example, when the statistical process instruction information instructs not to perform a statistical process, at step S402, the mobile station, in accordance with said information, does not carry out any form of statistical process on the plurality of measurement results of each beam.

In step S403, the measurement result is transmitted to the base station. According to an example of the present invention, information that is received at step S401 may include port information, in which the port information indicates the antenna ports for transmitting beams corresponding to reference signals. The mobile station determines an antenna port for transmitting a beam in accordance with the port information, and also determines a codebook for transmitting the measurement results to the base station. Furthermore, according to another example of the present invention, the information received at step S401 may include codebook information. When different codebooks exist in the same antenna port, the mobile station uses the portion information and the codebook information to determine a codebook for transmitting the measurement result. In step S403, the measurement result based on the determined codebook is transmitted to the base station.

In the radio communication method according to the above-described embodiment of the present invention, since the mobile station does not need to use the beams of all of the reference signal resources to carry out a measurement and only measures each beam that is transmitted using reference signal resources that are related to the mobile station, the mobile station can obtain an accurate channel estimation result for each beam without carrying out a large amount of calculations. Since the amount of beams that are measured decreases, the amount of measurement results (e.g., channel state information) that the mobile station needs to report to the base station also correspondingly decreases.

Figure 5:
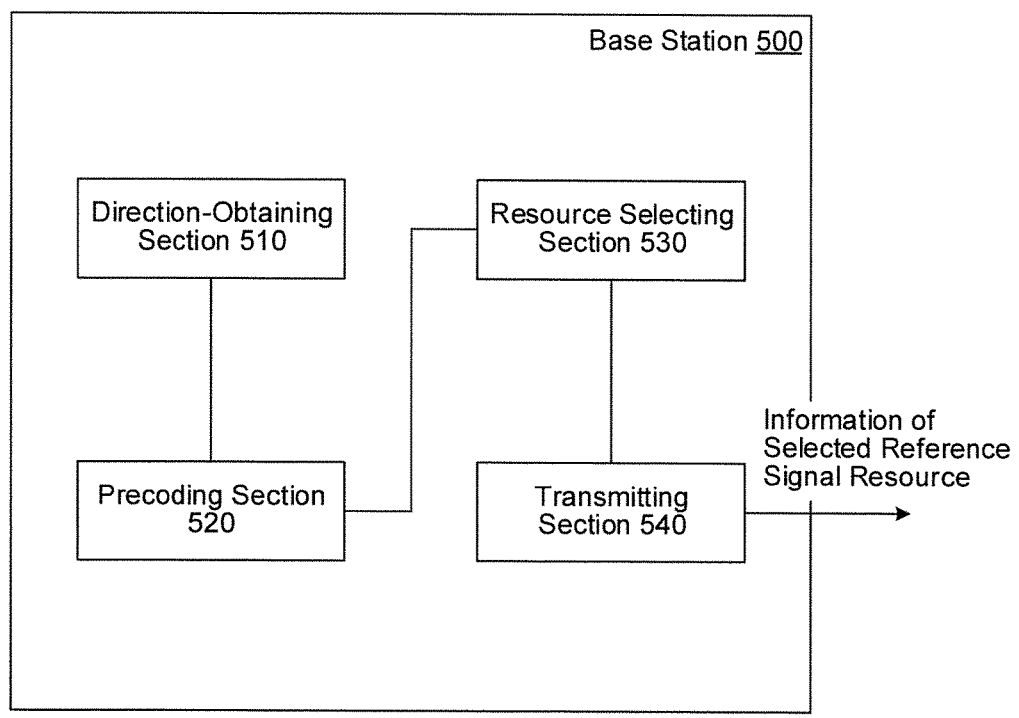
FIG. 5 is a block diagram showing a base station according to the present invention.

Hereinbelow, the base station according to the illustrated embodiment of the present invention will be described with reference to FIG. 5. FIG. 5 is a block diagram showing a base station according to the embodiment of the present invention. As shown in FIG. 5, a base station 500 includes a direction-obtaining section 510, a precoding section 520, a resource selecting section 530, and a transmitting section 540. Although the base station 500 may include other sections other than these four sections, such as, e.g., sections that perform various processes on data signals or control signals, since these sections are not related to the content of the illustrated embodiment of the present invention, such sections are omitted from the drawings and descriptions. Furthermore, since the specific details of the below-described operations performed by the base station 500, according to the illustrated embodiment of the present invention, are the same as the above-described details referenced to FIGS. 1 through 3, a duplicate description of the same details has been omitted to avoid repetition.

The direction-obtaining section 510 obtains a channel direction of the mobile station. For example, the direction-obtaining section 510 estimates the uplink channel of the mobile station in accordance with an SRS, and a downlink channel is derived based on mutuality between the uplink channel and the downlink channel, thereby obtaining the channel direction of the mobile station.

As another example, the direction-obtaining section 510 first transmits an existing CSI-RS, to which beamforming is not applied, to the mobile station. The mobile station reports the direction indicator (CDI) thereof. The direction-obtaining section 510 obtains the channel direction of the mobile station in accordance with the CDI.

As another example, the direction-obtaining section 510 transmits a discovery reference signal (DRS) that has been subject to beamforming to the mobile station. The mobile station reports the selected reference signal received power (RSRP) using the DRS. Thereafter, the direction-obtaining section 510 obtains the channel direction of the mobile station in accordance with the RSRP measurement that is reported by the mobile station.

The precoding section 520 generates a beam corresponding to the reference signal (e.g., CSI-RS) by precoding in accordance with the obtained channel direction. When mobile stations are located at different locations within the same cell, since the channel direction of each mobile station at each location is different, the beams corresponding to the reference signals that are generated by the precoding section 520 in accordance with each channel direction of each mobile station are different.

The resource selecting section 530 selects at least one reference signal resource for transmitting the generated beam(s) from a plurality of preconfigured reference signal resources. Specifically, the number of reference signal resources selected by the resource selecting section 530 is less than the number of the plurality of preconfigured reference signal resources. Furthermore, the transmitting section 540 transmits information indicating the reference signal resource that was selected by the resource selecting section 530 to the mobile station, and the mobile station measures the beams that are transmitted using at least one reference signal source based on said information. For example, information that indicates the selected reference signal resources may include time resource allocation, frequency resource allocation and/or coding resource allocation, etc., corresponding to the reference signal resources.

According to an example of the present invention, the information that is transmitted to the mobile station may include measurement window information that indicates the allocation of a plurality of measurement windows, wherein the base station does not change the precoding scheme in one of the measurement windows, i.e., does not use a specified reference signal resource to change the transmitted beam. Furthermore, a plurality of measurement windows do not overlap each other. The mobile station carries out a statistical process on a plurality of measurement values of beams that are transmitted by specified reference signal resources in the same measurement window in accordance with measurement window information transmitted by the base station, and avoids carrying out a statistical process on a plurality of measurement values of beams that are transmitted by specified reference signal resources in a different measurement window.

For example, the measurement window may be a measurement window in the time domain, or a measurement window in the frequency domain. In another example, the measurement window information may include the starting position of the measurement window and the length of the measurement window. The starting position of the measurement window may be notified in accordance with the starting position of the subframe and a shift amount with respect to the starting position of the subframe. Furthermore, the measurement window information may include the number of resource blocks included in each resource window. For example, measurement window information with respect to a measurement window in a frequency domain may include 'k' frequency blocks that are included in each resource ('k' being a natural number greater than 1). The mobile station can determine that all of the frequency bands used by the base station are evenly divided into a plurality of measurement windows in accordance with the measurement window information, and that each measurement window includes k frequency blocks.

Alternatively, in another example of the present invention, the information that is transmitted to the mobile station may include statistical process instruction information; this statistical process instruction information instructs whether or not the mobile station performs a statistical process on the plurality of measurement results of each beam. For example, statistical process instruction information instructs not to perform a statistical process, whereby, in accordance with said information, the mobile station does not carry out any form of statistical process on the plurality of measurement results of each beam.

Furthermore, the base station 500 transmits the beams corresponding to reference signals via at least two antennas. For example, each antenna port of the transmission beams indicates one polarized wave. According to an example of the present invention, the information that is transmitted to the mobile station may include port information, in which the port information indicates the antenna ports for transmitting the beams that are generated in accordance with the channel direction of the mobile station. Accordingly, the mobile station determines a codebook to be used when feeding back the measurement results of the beams in accordance with port information. Furthermore, according to another example of the present invention, information that is transmitted to the mobile station may include codebook information. Accordingly, in the case where different codebooks exist in regard to the same antenna port, the mobile station can determine the codebook that the mobile station should use when feeding back the measurement results of the beams in accordance with the portion information and the codebook information.

Furthermore, in order to reduce the signaling overhead and improve flexibility, according to another example of the present invention, the information that is transmitted by the transmitting section 540 to the mobile station includes at least two parts. Specifically, the information transmitted to the mobile station may include first resource information, and the first resource information indicates a resource number list of a selected at least one reference signal resource, and the number of beams of which the measurement results thereof need to be reported by the mobile station. Furthermore, the information that is transmitted to the mobile station may include second resource information. The second resource information includes transmission resource information of each reference signal that is indicated by the resource numbers included in the first resource information, in which the transmission resource information may be information on time, frequency or coding resource for transmitting the beams corresponding to the reference signals. The second resource information may include only transmission resource information regarding a plurality of preconfigured reference signal resources.

Furthermore, the first resource information may include information for applying all of the reference signal resources, and the second resource information may include information for applying only the reference signal resources that are selected for a specified mobile station. For example, when a measurement window configured by the base station is applied to all of the reference signal resources, the first resource information may include the measurement window information, and when a measurement window configured by the base station is applied only to the reference signal resources selected for a specified mobile station, the second resource information may include the measurement window information.

Similarly, when antenna ports that transmit beams and a codebook that should be used when the mobile station feeds back the measurement results of the beams are applied to all of the reference signal resources, the first resource information may include the port information and codebook information; and when antenna ports that transmit beams and a codebook that should be used when the mobile station feeds back the measurement results of the beams are applied only to the reference signal resources selected for a specified mobile station, the second resource information may include the antenna port information and codebook information.

Furthermore, alternatively, the information that is transmitted to the mobile station by the transmitting section 540 may include temporary resource information; the temporary resource information instructs a temporary change in the first resource information and the second resource information. For example, when necessary, the temporary resource information may instruct to reset the measurement window.

Temporary resource information in regard to each user may be transmitted. Alternatively, temporary resource information in regard to each cell or a specified user set may be transmitted. Furthermore, according to an example of the present invention, the first resource information and the second resource information may be transmitted by RRC signaling, and the temporary resource information may be transmitted by transmission of DCI signaling, which is transmitted more frequently than RRC signaling.

According to the base station of the embodiment of the present invention, the base station generates beams corresponding to reference signals by precoding reference signals in accordance with the directions of each mobile station, and notifies each mobile station of at least one reference signal resource for transmitting the generated beams. Each mobile station can obtain a more accurate channel estimation result by measuring the gain of each beam in accordance with the beams for each mobile station that are transmitted that the base station used to transmit the reference signal resources. Furthermore, since the base station only notifies each mobile station of at least one reference signal resource for transmitting the beams for the mobile station, the signaling overhead necessary for carrying out the measurement of the gain of each beam can be reduced.

Figure 6:
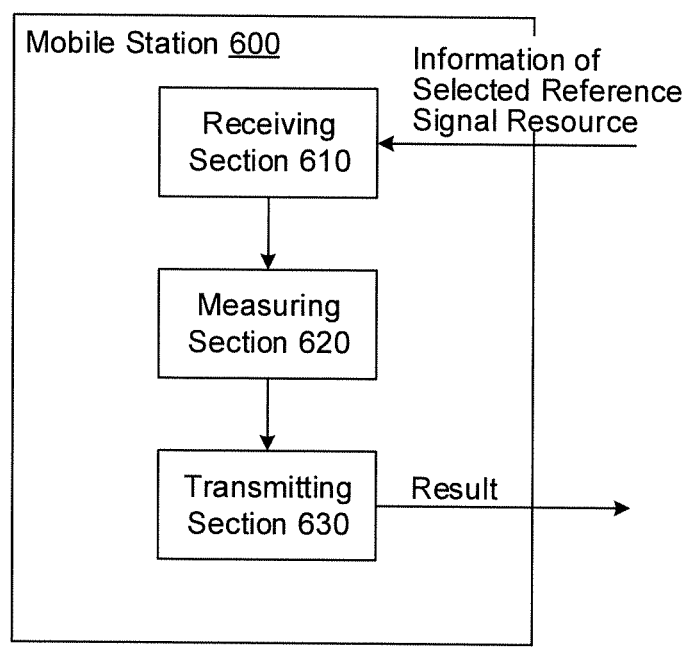
FIG. 6 is a block diagram showing a mobile station according to the present invention.

Hereinbelow, the mobile station according to the embodiment of the present invention will be described with reference to FIG. 6. FIG. 6 is a block diagram showing a mobile station according to the embodiment of the present invention. As shown in FIG. 6, a mobile station 600 includes a receiving section 610, a measuring section 620, and a transmitting section 630. Although the mobile station 600 may include other sections other than these three sections, such as, e.g., sections that perform various processes on data signals or control signals, since these sections are not related to the content of the illustrated embodiment of the present invention, such sections are omitted from the drawings and descriptions. Furthermore, since the specific details of the below-described operations performed by the mobile station 600, according to the illustrated embodiment of the present invention, are the same as the above-described details referenced to FIG. 4, a duplicate description of the same details has been omitted to avoid repetition.

The receiving section 610 receives, from the base station, information that indicates at least one reference signal resource for the mobile station, in which the at least one reference signal resource is selected by the base station from a plurality of preconfigured reference signal resources. The 620 measures the beams transmitted using the at least one reference signal resource based on the information received from the receiving section 610, and generates measurement results. For example, information that indicates the selected reference signal resource(s) may include time resource allocation, frequency resource allocation and/or coding resource allocation, etc., corresponding to the reference signal resource(s). The measuring section 620 measures the beams corresponding to the reference signals transmitted by the corresponding resource by the base station in accordance with the time resource allocation, the frequency resource allocation and/or the coding resource allocation indicated by the received information.

As described above, according to an example of the present invention, the information that indicates the at least one reference signal resource for the mobile station may include first resource information and second resource information. In this case, the measuring section 620 first determines the resource number of the reference signal resource that requires measurement in accordance with the first resource information, and obtains specific information on the reference signal resource corresponding to the resource number from out of the second resource information in accordance with the resource number.

Furthermore, according to another example of the present invention, the measuring section 620 includes a measuring module and a statistical process module. The measuring module may obtain a plurality of measurement values by measuring the reference signal transmitted using a reference signal resource a plurality of times per each reference signal resource. Furthermore, by performing a statistical process on the obtained plurality of measurement values, the statistical process module calculates a final measurement result of the beam that is transmitted by the reference signal resource. The obtained plurality of measurement values may be averaged to obtain a measurement result. Alternatively, a weight-summing process, etc., may be performed on the plurality of measurement values to obtain a measurement result. Furthermore, the mobile station 600 may measure beams a plurality of times, at a predetermined period, on a specified frequency indicated in the information received by the receiving section 610.

In order to ensure that the plurality of measurement results subject to statistical processing in the mobile station are measurement results of the same beam, the information received by the receiving section 610 may include measurement window information that indicates the allocation of a plurality of measurement windows. As described above, in one measurement window, a beam that is transmitted using at least one reference signal resource does not change. By carrying out a statistical process on the plurality of measurement values obtained in the same measurement window per each reference signal resource, the statistical process module generates a measurement result of the reference signals in the reference signal resource, and does not carry out a statistical process on the plurality of measurement values obtained in different measurement windows. Furthermore, it is desirable for the measuring section to include a deletion module. When the number of measurements of the beams that are transmitted using the reference signal resources reach a measurement-number upper limit that is indicated in the measurement window information, the data history of the measurement values is deleted to avoid an influence on a measurement result of beams in a new measurement window.

According to another example of the present invention, the information received in the receiving section 610 may include statistical process instruction information; this statistical process instruction information instructs whether or not the mobile station performs a statistical process on the plurality of measurement results of each beam. For example, when the statistical process instruction information instructs not to perform a statistical process, the measuring section 620, in accordance with said information, does not carry out any form of statistical process on the plurality of measurement results of each beam.

The transmitting section 630 transmits the measurement result to the base station. According to an example of the present invention, information that is received by the receiving section 610 may include port information, in which the port information indicates the antenna ports for transmitting beams corresponding to reference signals. The mobile station determines an antenna port for transmitting a beam in accordance with the port information, and also determines a codebook for transmitting the measurement results to the base station. Furthermore, according to another example of the present invention, the information received by the receiving section 610 may include codebook information. When different codebooks exist in the same antenna port, the mobile station uses the portion information and the codebook information to determine a codebook for transmitting the measurement result. The transmitting section 630 transmits the measurement result based on the determined codebook to the base station.

In the mobile station according to the above-described embodiment of the present invention, since the mobile station does not need to use the beams of all of the reference signal resources to carry out a measurement and only measures each beam that is transmitted using reference signal resources that are related to the mobile station, the mobile station can obtain an accurate channel estimation result for each beam without carrying out a large amount of calculations. Since the amount of beams that are measured decreases, the amount of measurement results (e.g., channel state information) that the mobile station needs to report to the base station also correspondingly decreases.

The operations of the base station 500 and the mobile station 600 may be achieved with hardware, may be achieved with a software module performed by a processor, or may be achieved by a combination of both.

The software module may be provided in a storage medium of a desired format, for example, RAM (Random Access Memory), flash memory, ROM (Read Only Memory), EPROM (Erasable Programmable ROM), EEPROM (Electrically Erasable Programmable ROM), a resistor, a hard disk, a removable disk, or a CD-ROM.

This storage medium is connected to a processor in order for the processor to write information on this storage medium and to read information from this storage medium. This storage medium may be provided in the processor. This storage medium and the processor may be provided in an ASIC. Such a ASIC may be provided in each of the base station 500 and the mobile station 600. The storage medium and the processor may be provided in the base station 500 and the mobile station 600 as discreet components.

Hence, the present invention has been described in detail using the above embodiments; one skilled in the art would understand that the present invention is not limited to the described embodiments. The present invention can be modified or changed, within the spirit and scope of the present invention of the claims. Accordingly, the descriptions in the specification are strictly explanatory, and do not limit the scope of the present invention.

The invention claimed is:

1. A mobile station comprising:
a receiving section that receives first resource information including a list about a resource number of a reference signal resource, second resource information about a reference signal indicated by the resource number included in the first resource information, and measurement window information that indicates an allocation of a measurement window;
a measuring section that measures a reference signal, to which precoding is applied, based on the first resource information, the second resource information, and the measurement window information; and
a transmitting section that transmits a measurement result, wherein the receiving section receives information that indicates a temporary change in the first resource information and the second resource information.

2. The mobile station according to claim 1, wherein if the receiving section receives the information that indicates the temporary change, the measuring section performs measurement of the reference signal based on the information that indicates the temporary change.

3. The mobile station according to claim 1,
wherein the receiving section receives multiple measurement window information, and
wherein the measuring section generates the measurement result per measurement window.

4. The mobile station according to claim 2,
wherein the receiving section receives multiple measurement window information, and
wherein the measuring section generates the measurement result per measurement window.

5. The mobile station according to claim 1,
wherein the receiving section receives port information that indicates an antenna port for transmitting the reference signal, and
wherein the measuring section determines the antenna port based on the port information.

6. The mobile station according to claim 2,
wherein the receiving section receives port information that indicates an antenna port for transmitting the reference signal, and
wherein the measuring section determines the antenna port based on the port information.

7. The mobile station according to claim 3,
wherein the receiving section receives port information that indicates an antenna port for transmitting the reference signal, and
wherein the measuring section determines the antenna port based on the port information.

8. The mobile station according to claim 4,
wherein the receiving section receives port information that indicates an antenna port for transmitting the reference signal, and
wherein the measuring section determines the antenna port based on the port information.

9. The mobile station according to claim 5,
wherein the receiving section receives codebook information that indicates a codebook, and
wherein the transmitting section transmits the measurement result based on a given codebook that is determined by using the port information and the codebook information.

10. The mobile station according to claim 6,
wherein the receiving section receives codebook information that indicates a codebook, and
wherein the transmitting section transmits the measurement result based on a given codebook that is determined by using the port information and the codebook information.

11. The mobile station according to claim 7,
wherein the receiving section receives codebook information that indicates a codebook, and
wherein the transmitting section transmits the measurement result based on a given codebook that is determined by using the port information and the codebook information.

12. The mobile station according to claim 8,
wherein the receiving section receives codebook information that indicates a codebook, and
wherein the transmitting section transmits the measurement result based on a given codebook that is determined by using the port information and the codebook information.

13. A base station comprising:
a precoding section that generates a beam corresponding to a reference signal by precoding; and a transmitting section that transmits first resource information including a list about a resource number of a reference signal resource, second resource information about a reference signal indicated by the resource number included in the first resource information, and a measurement window information that indicates an allocation of a measurement window to a mobile station in order for the mobile station to measure the reference signal to which the precoding is applied.

* * * * *